United States Patent [19]

Tsai

[11] Patent Number: 4,924,743
[45] Date of Patent: May 15, 1990

[54] MUSICAL DANCING BLOCK SET

[76] Inventor: Chao-Hsiung Tsai, P.O. Box 10160, Taipei, Taiwan

[21] Appl. No.: 337,326

[22] Filed: Apr. 13, 1989

[51] Int. Cl.⁵ ............................................. G09B 15/02
[52] U.S. Cl. ........................................................ 84/476
[58] Field of Search ................. 84/476, 464 R, 464 A, 84/453, 465

[56] References Cited

U.S. PATENT DOCUMENTS

| 491,833 | 2/1893 | Bowen et al. | 84/476 |
| 3,922,944 | 12/1975 | Kurosaki et al. | 84/464 R X |

Primary Examiner—L. T. Hix
Assistant Examiner—Brian W. Brown

[57] ABSTRACT

A block set includes a plurality of sounding blocks which can be optionally arranged and each block is provided an electronic or a mechanical sounding device in the block so that upon a treading on an individual block by a player's foot, the sounding block can be actuated to produce musical sound with respect to a specific scale note and upon a continuous treading on the plural blocks, a complete musical composition or song can be finished.

14 Claims, 3 Drawing Sheets

MUSICAL DANCING BLOCK SET

BACKGROUND OF THE INVENTION

A conventional sporting machine such as a hiker having a treading belt conveyed for a player's running is provided in a training center or family room for sporting purpose.

Such a conventional sporting machine is repeatedly played as lacking of diversified actions, and can not produce music whenever playing the machine.

It is therefore expected to disclose a means which can be optionally trodden for producing music for dancing, sporting and music playing purposes.

SUMMARY OF THE INVENTION

The object of the present invention is to provide a musical dancing block set by optionally assembling a plurality of sounding blocks each block indicating a scale note and capable of producing music with respect to a specific scale note printed on the block, so that upon a continuous treading on the blocks by a player's foot, a musical composition will be formed and a sporting or dancing purpose may be effected during jumping and treading on the sounding blocks.

Figure 1:
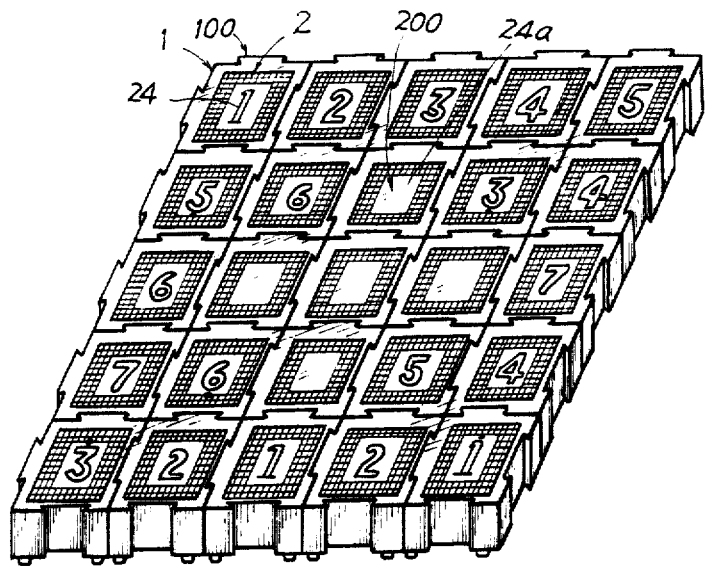
FIG. 1 is a perspective view of a block set of the present invention.
Figure 2:
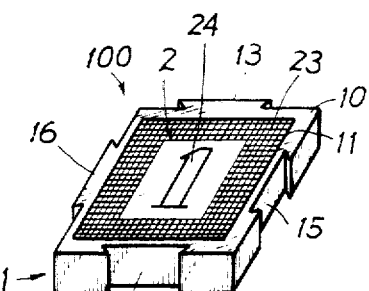
FIG. 2 is a perspective view of an individual block of the present invention.
Figure 4:
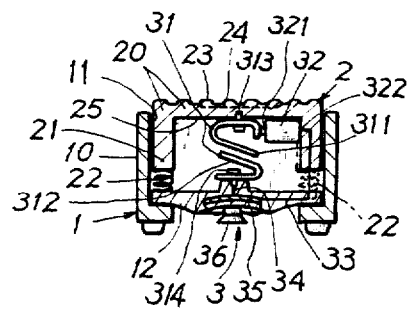
FIG. 4 is a sectional drawing of the block of the present invention.

DETAILED DESCRIPTION:

The present invention comprises a block set as shown in FIG. 1 assembled by a plurality of sounding blocks 100 as shown in FIG. 2. As shown in FIGS. 1, 2, 4, the sounding block 100 includes: a casing 1, a treadle member 2, and a sounding means 3.

The casing 1 may be shaped as a cubic, a parallelepiped or other suitable shapes and includes: a vertical side wall 10 circumferentially confining a downwardly-concave socket 11 for reciprocatively receiving the treadle member 2, a bottom plate 12 formed on a bottom portion of the casing 1, a front extension 13 protruding outwardly from a front edge of the side wall 10, a rear recess 14 formed in a rear edge of the side wall 10, a right recess 15 formed in a right edge of the side wall 10, and a left extension 16 protruding outwardly from a left edge of the wall 10. Each block 100 may be engaged with any other block 100 by engaging one extension 13 or 16 with another corresponding recess 14 or 15 of any neighboring block.

Figure 3:
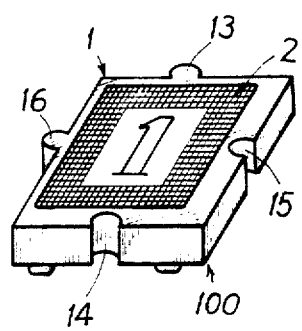
FIG. 3 shows another individual block of the present invention.

The shape of the extension 13 or recess 14 may be a trapezoid or dovetail as shown in FIG. 2 or may be a secant circular shape as shown in FIG. 3 or any other suitable shapes.

The treadle member 2 includes: an upper plate 10 having a side wall 21 protruding downwardly from the upper plate 10 to circumferentially confine and upwardly-concave socket 25, a plurality of restoring springs 22 retained between a lower edge of the side wall 21 of the treadle member 2 and a bottom plate 12 of the casing 1, an anti-slipping corrugation surface 23 formed on the upper plate 20, and a scale note 24 selected from musical scale notes of 1, 2, 3, 4, 5, 6, 7, etc. (corresponding to music sound of Do, Re, Mi, Fa So, La, Si, etc.) printed or marked on a central position of the upper plate 20. The side wall 21 of the treadle member 2 is engageable with the socket 11 of the casing 1. The shape of the treadle member 2 is corresponding to the shape of the casing 1 for their mutual engagement.

The sounding means 3 made as electronic includes: a switch 31 having an upper contactor 311 secured to the upper plate 20 by a metallic screw 313 and a lower contactor 312 secured to the bottom plate 12 by another metallic screw 314, a battery 32 having its positive pole 321 connected with the upper contactor 311, a negative-pole wire 33 connected to a negative pole 322 of the battery 32, a positive-pole wire 34 connected to the lower contactor 312 of the switch 31, a sounding integrated circuit 35 connected between the positive-pole wire 34 and the negative-pole wire 33 to be powered by the battery 32 when the switch 31 is closed, and a buzzer 36 connected to output pins of the sounding integrated circuit 35. The upper contactor 311 is normally separate from the lower contactor 312 for switching off the power.

The buzzer 36 can also be modified by a loudspeaker powered directly by the battery 32 for amplifying output signals from the sounding integrated circuit 35. The sounding integrated circuit 35 may be selected from those integrated circuits available in the market and may produce musical sound corresponding to a scale note 24 marked on the central portion of the upper plate 20. The negative-pole wire 33 can be also formed in situ as one restoring spring 22 retained between the side wall 21 and the bottom plate 12 as shown in FIG. 4.

When treadling the upper plate 20 of the treadle member 2, the gravitational force actuated by a player's foot F may lower the upper plate 20 to contact the upper contact 311 with the lower contactor 312 of the switch 31 to power the integrated circuit 35 for its sounding which is amplified by the buzzer 36.

Figure 5:
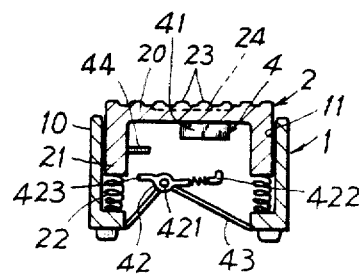
FIG. 5 is a sectional drawing of another preferred block of the present invention.

As shown in FIG. 5, the electronic sounding means 3 may be modified to be a mechanical sounding means 4 including: a sounding element 41, a striking element 42, a bracket 43, and a starter 44 for actuating the striking element 42.

The sounding element 41 may be made as: a cylinder, a pipe, a plate, a wire or any other suitable shapes which may exert sound as being striken, and may be made of: metals, bamboo, wooden material, glass, leather, plastic materials, etc. The sounding element 41 may be striken to produce sound with respect to its length or diameter. For instance, a longer pipe may produce a sound lower than a shorter pipe.

The striking element 42 may be a seesaw having a pivot 421 for pivotally securing the element on a bracket 43 fixed on the bottom plate 12, a striking end portion 422 of a spring or a plate formed on one end of the element 42 striking the sounding element 41 when lowering the treadle member 2 by treadling the block 100, a depression end portion 423 formed on the other end of the element 42 opposite to the striking end portion 422, and a starter 44 formed as an impacting rod protruding from an inside wall of the side wall 21 which may be lowered when treadling the block 100 to depress the depression end portion 423 so as to seesawly bias the striking end portion 422 for striking the element 41 for its sounding. The right end portion 422 may be longer than the left end portion 423 so that the left end may be normally biased upwardly, ready for impacting by the starter 44. The right end portion 422 may be vibrationally actuated to continuously strike the element 41, even the player's foot being still treading on the treadle member 2. When the player's foot F is leaving from the upper plate 20, the spring 22 will restore the treadle member 2 to separate the element 41 from the striking element 42.

Figure 8:
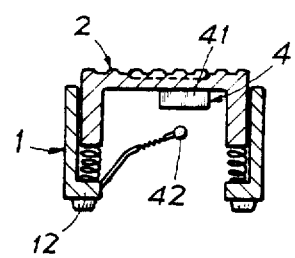
FIG. 8 is a sectional drawing of still further preferred block of the present invention.

The striking element 42 may also be modified to another preferred embodiment as shown in FIG. 8 to eliminate the starter 44 and the bracket 43. The striking element 42 may be formed as a striking rod resiliently secured to the bottom plate 12.

Figure 6:
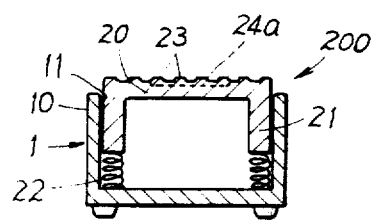
FIG. 6 is a sectional drawing of still another preferred block of the present invention.

As shown in FIG. 6, the sounding means 3 or 4 is omitted to form a silent block 200 which is not printed or marked any scale note on the upper plate 20 and may only reveal blank 24a on the upper plate 20. Such silent blocks 200 are assembled in a central zone of the block set as shown in FIG. 1 so that a player may initially stand on the central silent blocks 200 for preparing her or his dancing action.

Figure 7:
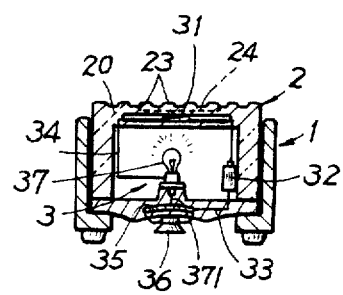
FIG. 7 is a sectional drawing of further preferred block of the present invention.

As shown in FIG. 7, the switch 1 of the electronic sounding means 3 is modified to be a micro switch or pressure-sensitive switch directly formed inside the upper plate 20 which may be closed by a gravitational force trodden by a player's foot, and a bulb 37 is connected between a positive-pole wire 34 connected to the switch 31 and a lead wire 371 connected to the sounding integrated circuit 35. The upper plate 20 may be made of light-transmissive of transparent material, such as polycarbonate sheet. When treadling the treadle member 2 to close the switch 31, the bulb 37 is switched on and the sounding integrated circuit is actuated to produce music for enhancing audio and visual effects, entertaining the player.

Figure 10:
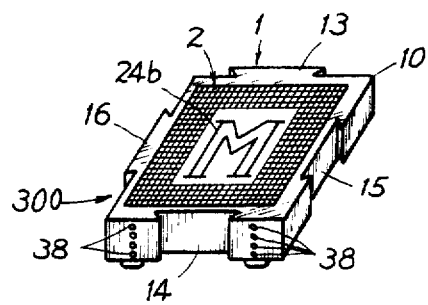
FIG. 10 is a perspective view of an individual block among the block set as shown is FIG. 9.
Figure 9:
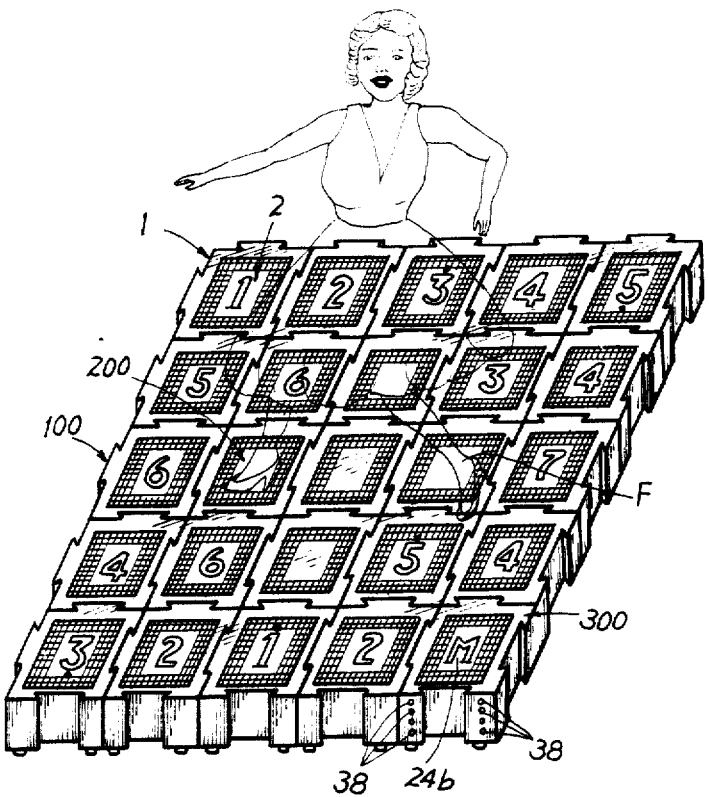
FIG. 9 is a perspective view of another preferred embodiment of block set of the present invention.

As shown in FIGS. 10, 9, a memory block 300 having M mark (24b) forming thereon is provided in this invention which includes an electronic sounding means capable of memorizing several musical compositions or songs (not shown) and several selectors 38 which may be depressed to select any preferred melody or song so that a player may hear the music of a composition to be familiar with the melody and then she or he may practice the dancing so well by the accompanist musical melody. Naturally, the present invention may be modified by those skill in the art to coordinate a plurality of blocks 100 to "pre-set" a musical composition or a song, which after being sounding and illuminated by each bulb provided in each block, the player may follow the music or optical instructions as preset to jump and treadle each individual sounding/illuminating block to continuously finish a complete composition or song for fancy interest.

I claim:

1. A musical dancing block set comprising: a plurality of sounding blocks optionally assembled to form a block set, each sounding block capable of producing music with respect to a specific scale note, said sounding block comprising:

a casing having a vertical side wall circumferentially confining a downwardly-concave socket and a bottom plate formed on a bottom portion of said casing;

a treadle member having an upper plate printed or marked with a scale note on a central portion thereof, a second side wall protruding downwardly from said upper plate circumferentially confining an upwardly-concave socket, said second side wall resiliently received in said downwardly-concave socket in said casing retained on said bottom plate by a restoring spring;

a sounding means provided in said treadle member and said casing having a switch depressibly closed as trodden by a player's foot on said treadle member for producing a musical sound, whereby upon a continuous treading on a plurality of the sounding blocks of different scale notes, a musical composition can be completely played by a player's foot.

2. A musical dancing block set according to claim 1, wherein said sounding block includes a front extension protruding outwardly from a front edge of said side wall of said sounding block, a rear recess formed in a rear edge of said side wall, a right recess formed in a right edge of said side wall, and a left recess formed in a left edge of said side wall, one said sounding block optionally engageable with another neighboring sounding block with one extension of one said block engaged with another adjacent recess of another said block.

3. A block set according to claim 1, wherein said treadle member is formed an anti-slipping corrugation surface on said upper plate of said treadle member.

4. A block set according to claim 1, wherein said sounding means is an electronic sounding means including a switch formed under said upper plate of said treadle member operatively closed upon a treading by a player's foot on said treadle member, a sounding integrated circuit electrically connected between a positive pole and and a negative pole of said battery by two wires through said switch, and a buzzer connected to an output of said sounding integrated circuit, said switch being normally open and depressibly closed upon a player's treading to actuate said integrated circuit for its sounding as powered by said battery.

5. A block set according to claim 4, wherein said electronic sounding means further comprises a bulb electrically connected between said positive and negative poles of said battery and controlled by said switch.

6. A block set according to claim 4, wherein said switch includes an upper contactor secured under said upper plate of said treadle member and a lower contactor secured to said bottom plate of said casing, said upper contactor being depressibly contacted with said lower contactor to close said switch upon a treading on said treadle member.

7. A block set according to claim 4, wherein said switch is a pressure-sensitive switch formed in said upper plate of said treadle member.

8. A block set according to claim 1, wherein said treadle member has its upper plate made as light-transmissive or transparent.

9. A block set according to claim 1, wherein said sounding means is a mechanical sounding means including a sounding element secured to said upper plate of said treadle member, and a striking element secured to said bottom plate of said casing, said striking element operatively striking said sounding element for producing music sound when lowering said sounding element upon a treading on said treadle member.

10. A block set according to claim 9, wherein said sounding element is selected from: a pipe, a cylinder, a plate, and a wire capable of producing music sound as being striken by said striking element, having a length or diameter with respect to a specific scale note of said sounding block.

11. A block set according to claim 9, wherein said striking element is a seesaw pivotally secured on a bracket fixed on said bottom plate of said casing having a depression end portion formed on a left end of said seesaw depressibly impacted by a starter generally formed as an impacting rod secured inside said treadle member, and having a striking end portion formed on the other end of said seesaw operatively biased, as actuated by said starter when lowering said treadle member, for striking said sounding element for its music sounding.

12. A block set according to claim 9, wherein the striking element is a seesaw pivotally secured to a bracket fixed on a casing, having a longer right-end striking end portion made of spring plate and having a shorter left-end portion, said right-end portion being gravitionally pendant to bias said left-end portion upwardly ready for impacting by the starter.

13. A block set according to claim 1, wherein said block set further comprises at least a silent block having a treadle member resiliently held in said casing.

14. A block set according to claim 1, wherein said block set further comprises a memory block having memorized a plurality of musical compositions, melodies, and songs therein, and having means for selecting a specific song or music, said memory block being assembled to said block set having a plurality of said sounding blocks.

* * * * *